United States Patent

Arena et al.

Patent Number: 5,402,935
Date of Patent: Apr. 4, 1995

[54] VARIABLE RESISTANCE TEMPERATURE COMPENSATOR

[75] Inventors: Aldo Arena, Smithtown; Christopher Horan, Huntington; Brian Robinson, Bayside, all of N.Y.

[73] Assignee: Northrop Grumman Corporation, Los Angeles, Calif.

[21] Appl. No.: 190,362

[22] Filed: Feb. 2, 1994

[51] Int. Cl.⁶ .......................................... G05D 23/02
[52] U.S. Cl. ................................... 236/93 R; 236/102
[58] Field of Search ................. 236/102, 93 R, 101 R; 251/121

[56] References Cited

U.S. PATENT DOCUMENTS

| | | | |
|---|---|---|---|
| 2,859,768 | 11/1958 | Teague, Jr. | 236/93 R X |
| 3,294,148 | 12/1966 | Alvarado | 236/93 R X |
| 3,696,997 | 10/1972 | Gifford | 236/102 |
| 3,805,840 | 4/1974 | Byers, Jr. | 137/870 X |
| 3,980,103 | 9/1976 | Drzewiecki | 236/93 R X |
| 4,852,601 | 8/1989 | Chamberlin | 236/93 R X |
| 5,163,476 | 11/1992 | Wessman | 251/121 X |
| 5,174,497 | 12/1992 | White | 236/102 |

Primary Examiner—William E. Tapolcai
Attorney, Agent, or Firm—Terry J. Anderson; Karl J. Hoch, Jr.

[57] ABSTRACT

A compensation device receives an inlet fluid flow and adjusts the pressure at an outlet so as to maintain a constant Reynolds number throughout the operating temperature range of the fluid. This is accomplished by a metering valve device in the nature of a fluted pin which becomes displaced in response to fluid temperature variations. This displacement varies the exposed cross-sectional area of a fluted end of the pin as it becomes seated to a greater or lesser extent in response to temperature variations. This results in corresponding changes in pressure between the inlet and outlet of the device while maintaining a constant Reynolds number. An additional embodiment includes an unfluted pin which becomes seated in a fluted bore located in a removable knurled knob. This allows one to insert various knurled knobs with fluted bores which have geometric configurations particularly adapted for particular fluids. Such a modular approach avoids the necessity of dismantling the device.

3 Claims, 3 Drawing Sheets

VARIABLE RESISTANCE TEMPERATURE COMPENSATOR

FIELD OF THE INVENTION

The present invention relates to fluidic controls, and more particularly to a pressure regulation device sensitive to changes in temperature of a fluid passing therethrough.

BACKGROUND OF THE INVENTION

The present device is suitable for applications where the input pressure of a system varies with temperature. In the past a metering valve was controlled externally (either electromechanically or mechanically) to achieve a variation of pressure so as to maintain a constant Reynolds number. However, problems of mechanical failure or constant personnel attention make this approach unsuitable in many applications. Accordingly, it would be highly desirable for a passive control to be inserted in a flow path so that the pressure may be varied as a function of fluid temperature.

BRIEF DESCRIPTION OF THE PRESENT INVENTION

The present invention takes the form of a metering device which alters its flow metering capability as a function of fluid temperature. The present invention is passive and continually senses and adjusts the pressure of fluid at its inlet to meet the requirements of a system which needs a constant Reynolds number in a downstream fluidic device.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
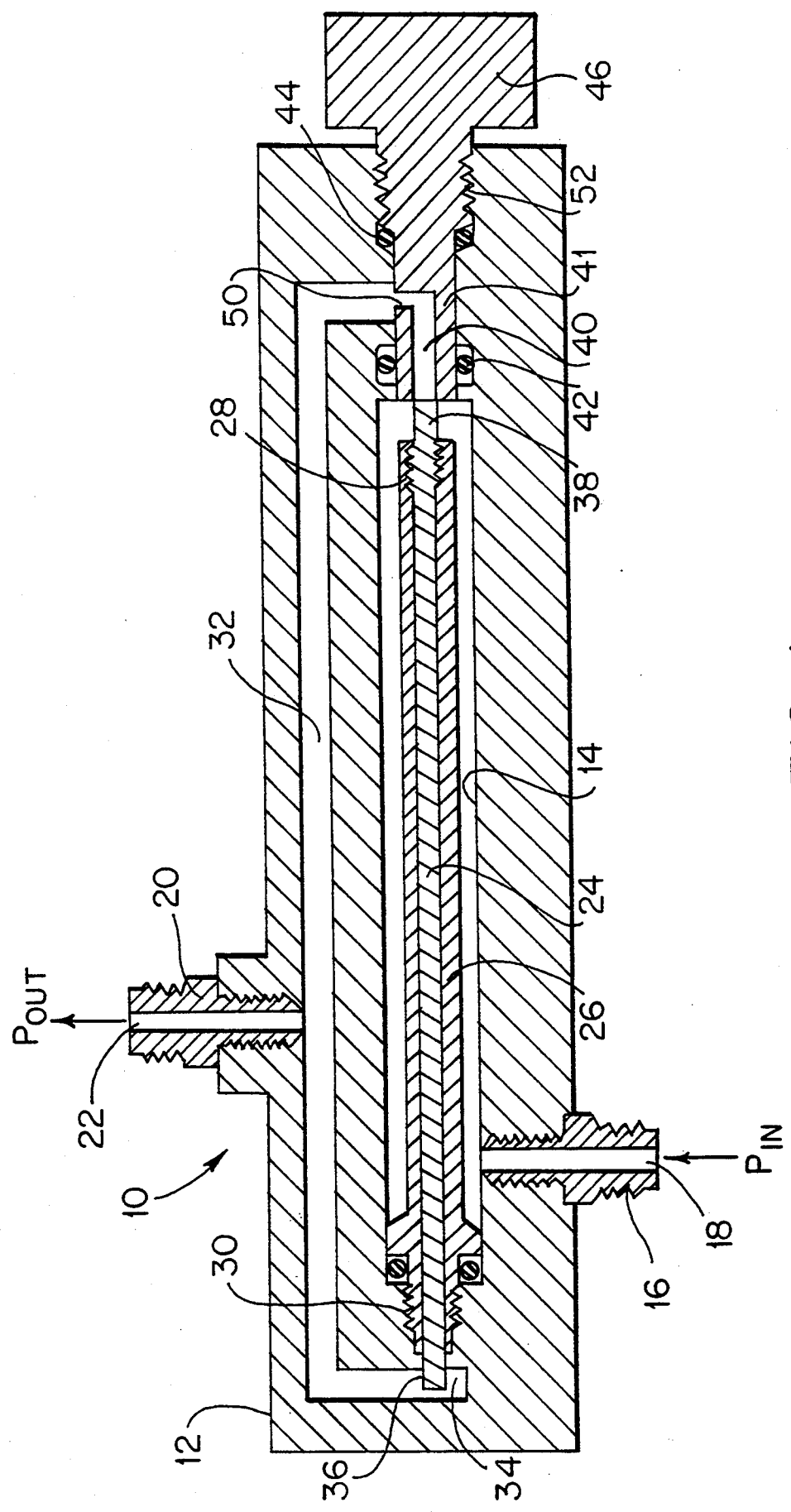
FIG. 1 is a sectional view taken along the axis of the present invention illustrating the interior components thereof.

Referring to FIG. 1, reference numeral 10 indicates a temperature compensation device of the present invention which essentially operates as a fluid metering valve. A metallic housing 12 encloses a centrally located and axially disposed annulus 14. A metallic inlet fitting 16 serves as an inlet port to the annulus for an inlet fluid. The device of the present invention will alter the pressure of the fluid as a function of its temperature to maintain a constant Reynolds number at an outlet fitting 20 which serves as an outlet port 22.

Axially disposed within the annulus 14 is a metal fluted pin 24 axially surrounded by a sleeve 26 of different material, such as Teflon. The material of the sleeve 26 and that of the housing are chosen so that they have large differences with respect to thermal expansion coefficients. The reason for this requirement will become apparent shortly. The right end portion of the fluted pin 24 is threaded to the sleeve 26, as indicated by reference numeral 28. The left end portion of the sleeve is threaded to an interior bore in the housing 12, as indicated by reference numeral 30. The left end 36 of pin 24 is free to slide in and out of the clearance generated at the left indicated branch 34 of a plenum 32 which extends, for the most part, along an internal longitudinal bore formed in the housing so as to communicate with the outlet port 22. As will be appreciated from viewing FIG. 1, as inlet fluid increases in temperature, a differential thermal expansion will occur between the metal of housing 12 and the sleeve 26 thereby relatively displacing the fluted pin 24.

As the fluid heals up, a flute at the right end of pin 24 (not seen in FIG. 1) exposes less cross-sectional area of a passageway between the annulus 14 and plenum 32 so as to adjust the pressure at the outlet port 22 as a function of fluid temperature so as to maintain a constant Reynolds Number.

Figure 2:
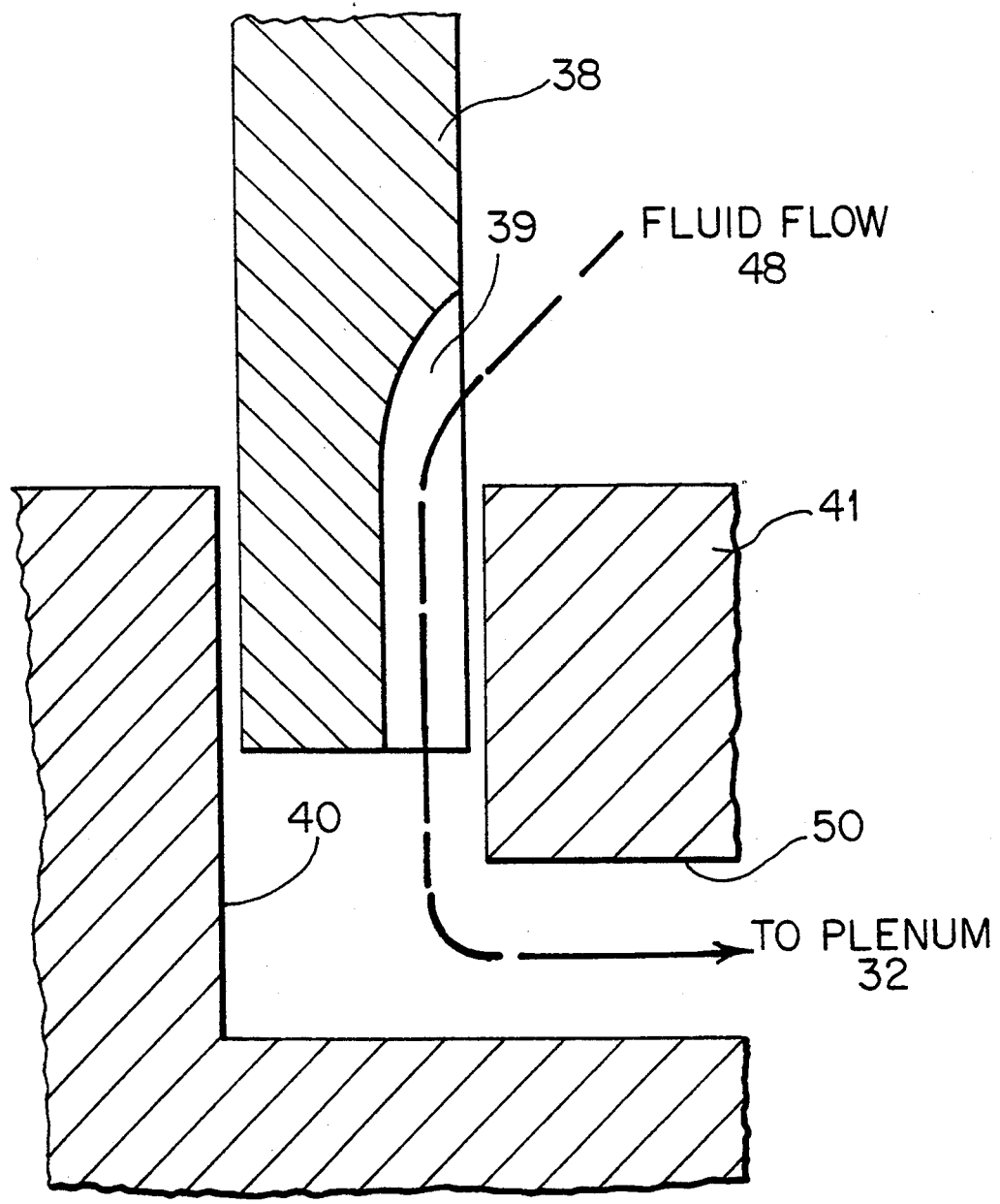
FIG. 2 is a partial sectional view showing a detail of the fluid metering components employed in the present invention.

An adjustment screw 41 has a centrally formed bore 40 in its left illustrated end, the bore serving as a guide for the fluted end 38 of pin 24, as shown in FIG. 2. A radial section 50 of the bore completes a path to the plenum 32. FIG. 1 illustrates the utilization of a first O-ring 42 between the left end of the adjustment screw 41 and an interior bore of the housing, while a second O-ring 44 forms a seal between threads 52 of the adjustment screw 41 and mating threads in the housing. A knurled knob 46 is formed at the outward right end of the adjustment screw 41 to facilitate a desired displacement of the flute 39 relative to bore 40 of the adjustment screw, as seen in FIG. 2.

In operation of the device, as inlet fluid at inlet 18 increases in temperature, the differential thermal expansion of the housing metal and the material of sleeve 26 causes relative displacement of the pin flute 39 (FIG. 2) relative to bore 40 so that less cross-sectional flute area is presented to the less viscous fluid passing therethrough. The pressure differential between inlet and outlet increases but with the proper choice of flute shape for the particular working fluid, the Reynolds number remains the same.

The fluted portion 39 of pin 24 may be replaced by a tapered end, but this could lead to less predictable performance due to the fact that this end would not be axially supported, which could result in a lack of concentricity of the pin relative to the bore 40, or even oscillations of the pin.

Figure 3:
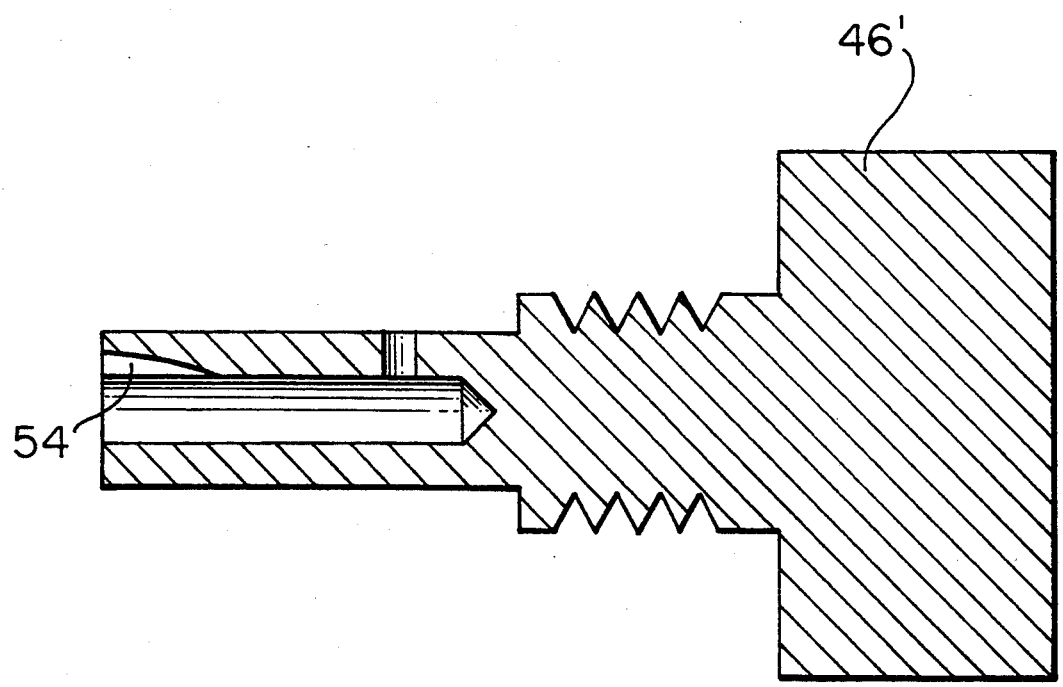
FIG. 3 is sectional view showing a detail of another embodiment of a fluid metering component of the present invention.

According to an additional embodiment of the invention, knurled knob 46' is formed with a fluted bore 54, as shown in FIG. 3. By using an unfluted pin in combination with a fluted knurled knob, it becomes possible to easily adapt the device to different fluids possessing different hydraulic properties by simply replacing one knurled knob with a fluted configuration adapted for a particular fluid, with other knurled knobs with fluted configurations peculiar to other fluids. This embodiment makes it possible to adapt the basic device without the necessity of dismantling the device.

It should be understood that the invention is not limited to the exact details of construction shown and described herein for obvious modifications will occur to persons skilled in the art.

We claim:

1. A device for regulating fluid pressure as a function of fluid temperature and comprising:
   a housing;
   a bore axially extending in the housing;

a pin axially extending within the bore and secured at a first end portion thereof to the housing;

a sleeve covering a major portion of the pin, the sleeve and the housing made of materials having different coefficients of expansion;

the pin and sleeve being secured together at a second end portion of the pin;

an inlet port communicating with the bore for introducing inlet flow therein;

a flute of variable cross section, formed in an end of the second end portion of the pin, for variably metering flow between the bore and a plenum formed in the housing as a function of fluid temperature, the flute being displaced in an orifice forming a fluid passageway between the bore and the plenum; and fluid outlet means located in the housing and communicating with the plenum for delivering fluid at a different pressure than the inlet pressure but maintaining a constant Reynolds number as temperature varies.

2. The device set forth in claim 1 wherein the orifice axially extends in an adjustment screw which itself axially extends in the housing, the adjustment screw being initially positioned relative to the flute so as to create a fluid passageway entry of preselected cross sectional area.

3. A method for maintaining a constant Reynolds number in a fluid, comprising the steps:

introducing fluid into a chamber;

subjecting the length of a first valve member, fabricated of a first material, to heat from the fluid contained in the chamber;

subjecting the length of a second valve member, fabricated of a second material, to heat from the fluid contained in the chamber;

the first and second valve members thereby undergoing differential thermal expansion which results in corresponding dimensional changes to a valve orifice and consequently, fluid flow therethrough;

an adjustably exposed fluted passageway interposed in the orifice for metering the fluid flow;

collecting the metered fluid in a plenum; and outleting the fluid from the plenum at a pressure differential with respect to the pressure when introduced into the chamber so as to insure a constant Reynolds number.

* * * * *